United States Patent
Ali

(10) Patent No.: US 9,594,475 B1
(45) Date of Patent: *Mar. 14, 2017

(54) TIME-BASED IMAGE DISPLAY

(71) Applicant: Mohammed Zulfikar Ali, Hayward, CA (US)

(72) Inventor: Mohammed Zulfikar Ali, Hayward, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/274,822

(22) Filed: Sep. 23, 2016

Related U.S. Application Data

(63) Continuation of application No. 14/076,377, filed on Nov. 11, 2013, now Pat. No. 9,459,774.

(60) Provisional application No. 61/755,776, filed on Jan. 23, 2013.

(51) Int. Cl.
*G06T 1/00* (2006.01)
*G06F 3/0482* (2013.01)

(52) U.S. Cl.
CPC .......... *G06F 3/0482* (2013.01); *G06T 1/0007* (2013.01); *G06T 2200/24* (2013.01)

(58) Field of Classification Search
CPC .............................. G06F 3/0482; G06F 3/0484
USPC ......................................................... 715/732
See application file for complete search history.

(56) References Cited

U.S. PATENT DOCUMENTS

| | | | | |
|---|---|---|---|---|
| 2005/0259949 | A1* | 11/2005 | Habuta | H04N 9/8042 386/290 |
| 2007/0104390 | A1* | 5/2007 | Foote | H04N 1/0035 382/284 |
| 2010/0079610 | A1* | 4/2010 | Suehiro | H04N 5/23219 348/222.1 |
| 2010/0153515 | A1* | 6/2010 | Lau | G06F 8/34 709/217 |
| 2014/0270547 | A1* | 9/2014 | Dwan | G06K 9/00684 382/224 |

OTHER PUBLICATIONS

WordPress.Org Forums, "If certain day (Sunday, Monday, etc) show certain Image (3 posts)." (online) Retrieved on Nov. 7, 2013. Retrieved from Internet: http://wordpress.org/support/topic/if-certain-day-sunday-monday-etc-show-certain-image, 1 page.

Windows "Create a desktop background slide show." (online) Retrieved on Nov. 7, 2013. Retrieved from internet: http://windows.microsoft.com/en-us/windows7/create-a-desktop-background-slide-show, 1 page.

Webmaster World.com "JavaScript and AJAX Forum" (online) Retrieved on Nov. 7, 2013. Retrieved from internet: http://www.webmasterworld.com/javascript/3470515.htm, 2 pages.

* cited by examiner

*Primary Examiner* — Andrea Leggett
(74) *Attorney, Agent, or Firm* — Fish & Richardson P.C.

(57) ABSTRACT

Methods, systems, and apparatus are provided for time-based image display. In an aspect, a method includes accessing two or more images; obtaining, for each of the images, a timestamp for the image; generating, based on the timestamps for each of the images, a slideshow schedule, the slideshow schedule specifying, for each of two or more time windows, one or more of the images for display during the time window; identifying, based on a current time, a current time window from the two or more time windows; and causing display of the one or more images specified by the slideshow schedule for the current time window.

15 Claims, 6 Drawing Sheets

TIME-BASED IMAGE DISPLAY

CROSS-REFERENCE TO RELATED APPLICATIONS

This application is a continuation application of, and claims priority to, U.S. patent application Ser. No. 14/076,377, titled "TIME-BASED IMAGE DISPLAY," filed on Nov. 11, 2013, which application claims priority under 35 U.S.C. §119(e) to U.S. Provisional Application Ser. No. 61/755,776, titled "Smart Wall Calendar," filed on Jan. 23, 2013. The disclosure of each of the foregoing applications is incorporated herein by reference.

BACKGROUND

This specification relates to displaying images based on time.

The use of electronic devices in viewing media, such as digital image files and video files, has led to the development of various devices and methods for presenting digital media to users. For example, personal computers allow a user to choose a background image to be displayed as the background of a user interface, and digital photo frames can display a slideshow of images stored on the device. These devices generally use simple methods for displaying images, such as displaying a particular image specified by a user, or randomly shuffling through images stored on the device.

SUMMARY

In general, the subject matter described in this specification involves displaying images based on time.

In general, one innovative aspect of the subject matter described in this specification can be embodied in methods that include the actions of accessing two or more images; obtaining, for each of the images, a timestamp for the image; generating, based on the timestamps for each of the images, a slideshow schedule, the slideshow schedule specifying, for each of two or more time windows, one or more of the images for display during the time window; identifying, based on a current time, a current time window from the two or more time windows; and causing display of the one or more images specified by the slideshow schedule for the current time window. Other embodiments of this aspect include corresponding systems, apparatus, and computer programs, configured to perform the actions of the methods, encoded on computer storage devices.

These and other embodiments can each optionally include one or more of the following features. Obtaining, for each of the images, a timestamp for the image may comprise obtaining, for each of the images, an EXIF timestamp included in EXIF data for the image, the EXIF timestamp indicating a time the image was captured by an image capturing device.

Obtaining, for each of the images, a timestamp for the image may comprise obtaining, for each of the images, a user specified timestamp derived from user input.

For each time window, the timestamp of each image specified by the slideshow schedule for display during the time window may specify a time included in a period of time specified by the time window.

Each time window may specify a period of time spanning a calendar month. Each time window specifies a period of time spanning a calendar day.

The slideshow schedule may specify two or more images for display during a particular time window, and the slideshow schedule may further specify an alternating display of the two or more images during the particular time window.

The method may further comprise providing slideshow data to a user device, the slideshow data causing display, on the user device, of at least one of the one or more images specified by the slideshow schedule for the current time window.

Particular embodiments of the subject matter described in this specification can be implemented so as to realize one or more of the following advantages. Digital media, such as images, can be automatically displayed during periods of time that are relevant to the media. Users may customize the display of digital media during periods of time specified by the user, and users and third party media providers may share images or other media with other users for display in accordance with a particular schedule. In addition, different display devices may be synchronized, resulting in displaying images and/or other media in the same or similar manner across one or more users' devices. Each of the foregoing advantages may lead to satisfaction of users' informational and entertainment needs.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

An image display device facilitates the display of images based on time. For example, an image display device may obtain timestamps of images that are eligible for display and create a slideshow schedule that specifies which image(s) will be displayed for a given time.

An image display device may access images stored locally on the device, or images stored on a network storage device. The images may include a timestamp, such as a timestamp included in Exchangeable image file format (Exif) data, or provided by a user. Based on the timestamps, the image display device can create a slideshow schedule for displaying the images. For example, if ten images accessed by the image display device have a timestamp indicating that the images were captured on January 1, those ten images may be scheduled for displaying on the image display device when the current time is January 1. The ten images may alternate display, e.g., one every 30 seconds, or two or more can be displayed at the same time, e.g., as a collage. Other options for display may be used. For example, an image display device may be an electronic wall calendar, and images may be rotated in an image display portion of the calendar as well as in a calendar display portion, e.g., an image can be displayed in the box of a calendar associated with the day, January 1.

Time windows can be used during generation of a slideshow schedule. A time window may specify, for example, a period of time, such as a particular day, week, month, season, or year. Time windows may be predefined and/or configurable by a user. By way of example, an image display device may generate a slideshow schedule that specifies, for an example time window encompassing the month of January, every image with a timestamp specifying a time in January. During the month of January, an image display device may then cause the display of the images associated with the January time window.

While the following examples specify slideshow schedules for displaying images, other types of digital files and media may be presented according to a slideshow schedule based on timestamps. For example, video files, digital artwork files, and audio files may all have associated timestamps, and may all be presented on image display devices and/or user devices in accordance with a slideshow schedule.

Figure 1:
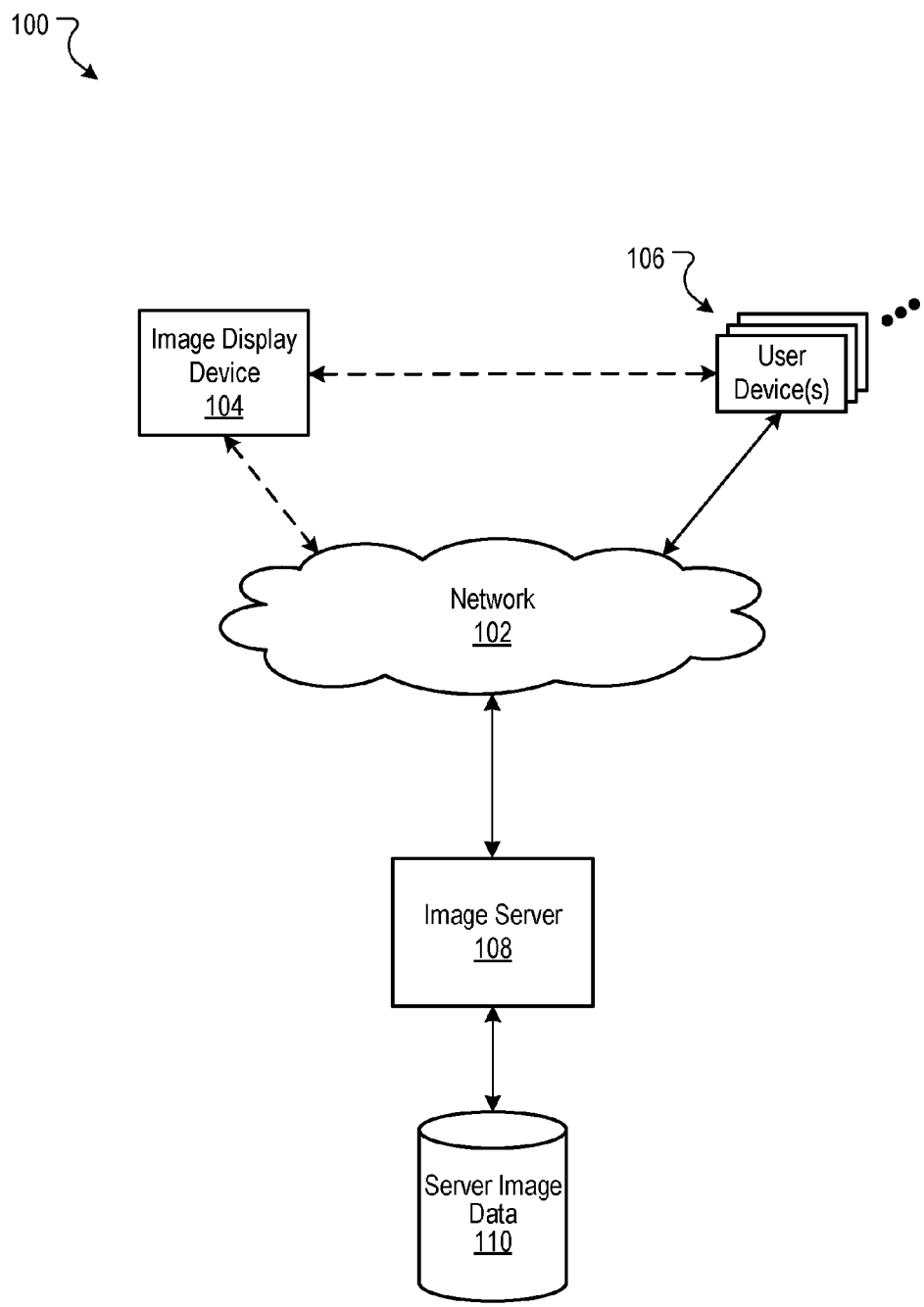
FIG. 1 is a diagram of an example environment in which images are displayed based on time.

FIG. 1 is a diagram of an example environment 100 in which images are displayed based on time. A computer network 102, such as a local area network (LAN), wide area network (WAN), the Internet, or a combination thereof, connects an image display device 104, user devices 106, and an image server 108. The online environment 100 may include more than one image server 108 and many user devices 106.

A user device 106 is an electronic device capable of communicating with the image display device 104, either directly, e.g., using a cable, Wi-Fi Direct, Bluetooth, or Near Field Communications (NFC) device, or over the network 102. Example user devices 106 include personal computers, mobile communication devices, and other devices that can send and receive data. A user device 106 typically includes a display for presenting information, such as text, images, and video.

An image server 108 is an electronic device capable of communicating with the image display device 104 and user devices 106 over the network 102. The image server 108 may be a server computer, or a cluster of server computers, that is capable of providing images to the image display device 104 and user devices 106. The image server 108 is connected to a storage device containing server image data 110, such as image files and associated image information, such as timestamps.

An image display device 104 is an electronic device capable of displaying images, e.g., using an LCD (liquid crystal display) or OLED (organic light emitting diode) monitor. The image display device 104 may be capable of communicating with the user devices 106 and image servers 108, directly and/or over the network 102. In some implementations, an image display device 104 is a type of user device. For example, the image display device 104 may be a personal computer or mobile communications device, such as a smart phone.

The image display device 104 can access images, e.g., from a local storage device, user devices 106, and/or an image server 108. Using timestamps associated with the images, the image display device 104 can generate a slideshow schedule that specifies which images will be displayed on the image display device 104 during various windows of time. Generating a slideshow schedule for displaying images is described in further detail below.

The particular embodiment shown in the example environment 100 is one example way in which the subject matter described herein may be implemented. While the example environment 100 is described using the image display device 104 as the device responsible for generating slideshow schedules, in some implementations another device, such as the image server 108, may generate a slideshow schedule. For example, the image server 108 may generate a slideshow schedule, and provide the schedule (or the image(s) to be displayed) to the image display device 104. In some implementations, an image server 108 may be capable of maintaining one or more user accounts that are each associated with one or more image display devices 104. The image server 108 may be capable of receiving user input from a user of an image display device 104 or user device 106 to facilitate the generation of a slideshow schedule.

Figure 2:
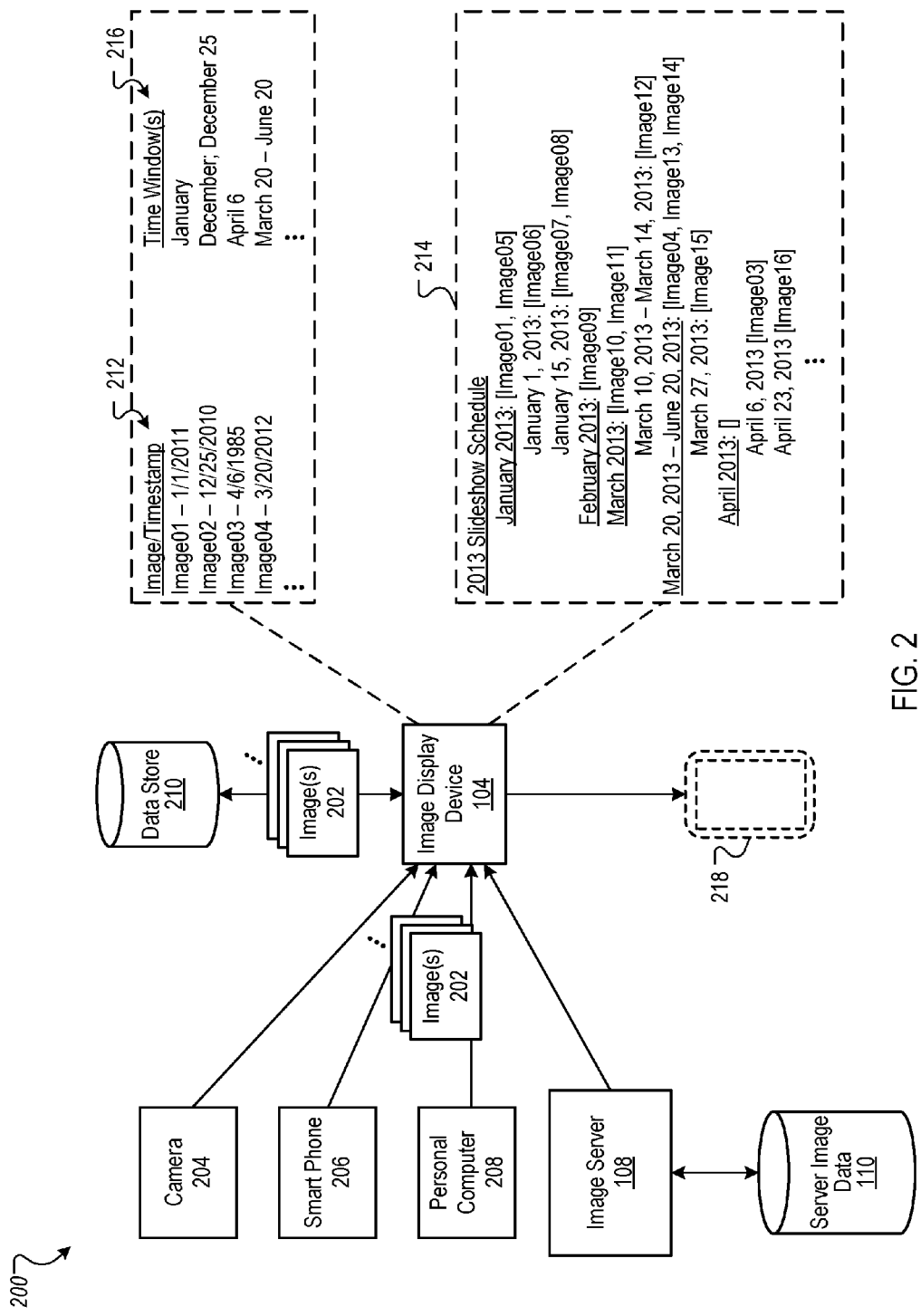
FIG. 2 is a diagram of an example data flow in which a slideshow schedule is generated for displaying images based on time.

FIG. 2 is a diagram of an example data flow 200 in which a slideshow schedule is generated for displaying images based on time. The image display device 104 accesses images 202. The images 202 may be provided by various devices, such as a camera 204, smart phone 206, personal computer 208, and/or image server 108. In some implementations, some or all of the accessed images 202 may be stored in a local data store 210 of the image display device.

The image display device 104 obtains a timestamp for each of the images 202. In the example data flow 200, timestamps 212 are depicted for several images. In some implementations, the timestamp may be obtained from metadata included in an image. For example, Exif data for an image may include a timestamp that indicates a date and/or time that an image was captured by an image capturing device. In some implementations, a timestamp can be provided by user input. For example, the image display device 104 may prompt a user to provide a timestamp for one or more images. As noted above, timestamps may indicate a date/time an image was captured; other example timestamps may indicate a date/time an image was uploaded to a server device, transferred to a user device or image display device, or any other date/time provided by a device or user.

Based on the timestamps 212 for the images 202, the image display device generates a slideshow schedule 214. The slideshow schedule 214, discussed in further detail below, specifies which image(s) will be displayed during which time window(s) 216. Time windows 216 may specify a period of time, such as a particular hour, day, month, season, or year. In some implementations, time windows may be predefined by the image display device 104. For example, the image display device 104 may predefine a time window for each calendar month, and a time window for each calendar day. In some implementations, time windows may be defined by user input. For example, a user may specify a time window spanning the months of summer. In some implementations, a time window may be configured to repeat, e.g., a time window may specify every Friday, or the first Sunday of each month.

The example data flow 200 depicts time windows 216 for some of the images 202. For example, Image01, which has a timestamp of 1/1/2011, is associated with a January time window. This indicates that Image01 is eligible for being displayed during the month of January. In some implementations, an image may be associated with multiple time windows. Image02 has a timestamp of 12/25/2010, and is associated with a December time window as well as a December 25 time window, which indicates that Image02 is eligible for being displayed during the month of December, as well as on December 25. In some implementations, images in more precise time windows have a higher priority for display during period of time in which multiple time windows apply. For example, the time window for December 25 is within the time window for December, and images associated with the December 25 time window may be prioritized for display over images in the December time window.

As noted above, the example slideshow schedule 214 specifies, for various time windows, the image(s) to be displayed during the time window. The example slideshow schedule 214 is for the year 2013, and it begins with a time window encompassing the month of January, 2013. According to the slideshow schedule 214, Image01 and Image05 are the images specified for display during the month of January. Two other time windows, one for January 1, and one for January 15, are within the January time window. On Jan. 1, 2013, the slideshow schedule 214 indicates that Image06 should be displayed.

In some implementations, when a current time is within two or more time windows, the images specified by those time windows may all be eligible for display. For example, when the current time is Jan. 1, 2013, Image06 (which corresponds to the January 1 time window) may be eligible for display, as well as Image01 and Image05 (which correspond to the January time window). In some implementations, images associated with a more precise time window may be prioritized. For example, on Jan. 1, 2013, Image06 may be eligible for display, but not Image01 or Image05. Or, images Image01 and Image05 may be eligible for display, but the length of time they are displayed on January 1 may be less than the length of time that Image06 is displayed. As another example, images Image01, Image05, and Image06 may all be displayed as part of a collage, with Image01 having a larger display area than Image05 and/or Image06.

In some implementations, images may be placed into one or more default time windows. For example, a default configuration of the image display device may associate each image with two time windows—one for the month that includes the image's timestamp, and one for the day that includes the image's timestamp. For example, an image with a timestamp of May 6, 2007, may be associated with a time window for the month of May and a time window for the day, May 6.

In some implementations, time windows and corresponding images may be customized based on user input. For example, a user wishing to see a particular image every Friday may cause the image display device 104 to create a time window for each Friday of the year. The user may also, in some implementations, associate one or more images with time windows. For example, the user may provide an image with a timestamp that results in the image being placed in a particular time window, or the user may specify that an image is to be displayed during one or more time windows, regardless of the timestamp.

The image display device 104 identifies a current time and causes the display of the images specified by the slideshow schedule for display during the time window(s) that correspond to the current time. Using the example slideshow schedule 214, for a current time of Jan. 15, 2013, there are two time windows, e.g., the time window for January, and the time windows for Jan. 15, 2013. In implementations where images in more precise time windows are displayed in lieu of those in less precise time windows, images Image07 and Image08 are the only images to be displayed. The image display device 104 may, by way of example, cause Image07 and Image08 to be alternatively displayed on a display 218 of the image display device 104.

In some implementations, images may be assigned a display priority, and be displayed according to the priority. As mentioned above, images that belong to a relatively precise time window may have a higher priority for display than images belonging to a time window encompassing a greater period of time. In some implementations, the priority of an image may depend on an age of the image, measured by its timestamp. For example, an image that is one year old may have a higher priority than an image that is ten years old. In some implementations, the priority of an image may depend on an image quality value for the image. Image quality may be measured, for example, by one or more metrics, such as a user rating or measure of image resolution (e.g., in pixels), where images with higher user ratings, or images of a greater resolution, may have a higher priority for display than images with lower user ratings or having a lower resolution. Image priority may be used, for example, to determine whether an image will be displayed at all, for what length of time an image will be displayed, the size of the image to be displayed, and/or the location in which the image is displayed. By way of example, if three images are to be displayed in a collage on an image display device, the image with the highest priority among the three may have the largest display area within the collage relative to the display areas of the other images.

In some implementations, a slideshow schedule may specify a particular time of day for displaying one or more images. For example, an image taken on Jul. 4, 2011 at 06:30:00 may be scheduled for display during a time window at or near 06:30:00 on July $4^{th}$. In situations where multiple images have timestamps on the same day, e.g., timestamps of 07/04/2011 06:30:00, 07/04/2005 12:00:00, and 07/04/2009 20:45:10, each image may be scheduled for display during a time window at or near the time of day that corresponds to the time of day specified by the timestamp. For example, the image with the timestamp of 07/04/2005 12:00:00 may be displayed at or near 12:00:00 on July $4^{th}$, while the image with the timestamps of 07/04/2009 20:45:10 may be displayed at or near 20:45:10 on July $4^{th}$. In some implementations, the time of day specified by a timestamp may affect display priority. For example, when multiple images are eligible for display on a particular day, the priority of each image may be affected by the time of day. An image with a timestamps of 06:30:00 may have a higher priority at 07:00:00 than at 22:00:00, while an image with a timestamps of 21:00:00 may have a higher priority at 22:00:00 than at 07:00:00. As noted above, the priority of an image can affect the manner in which the image is displayed, and can be used to determine whether an image is eligible for display at a given day/time. By way of example, images taken during the morning on a particular day may be more prominently displayed during the morning, while images taken later in the evening may be more prominently displayed during the evening.

The manner in which the image display device 104 causes display of images may change depending on the type of the image display device 104, or an environment in which images are to be displayed, e.g., within an application on the user device, as a background image, etc. Some examples of methods for causing the display of images are described with respect to FIGS. 3A and 3B, below.

Figure 3A:
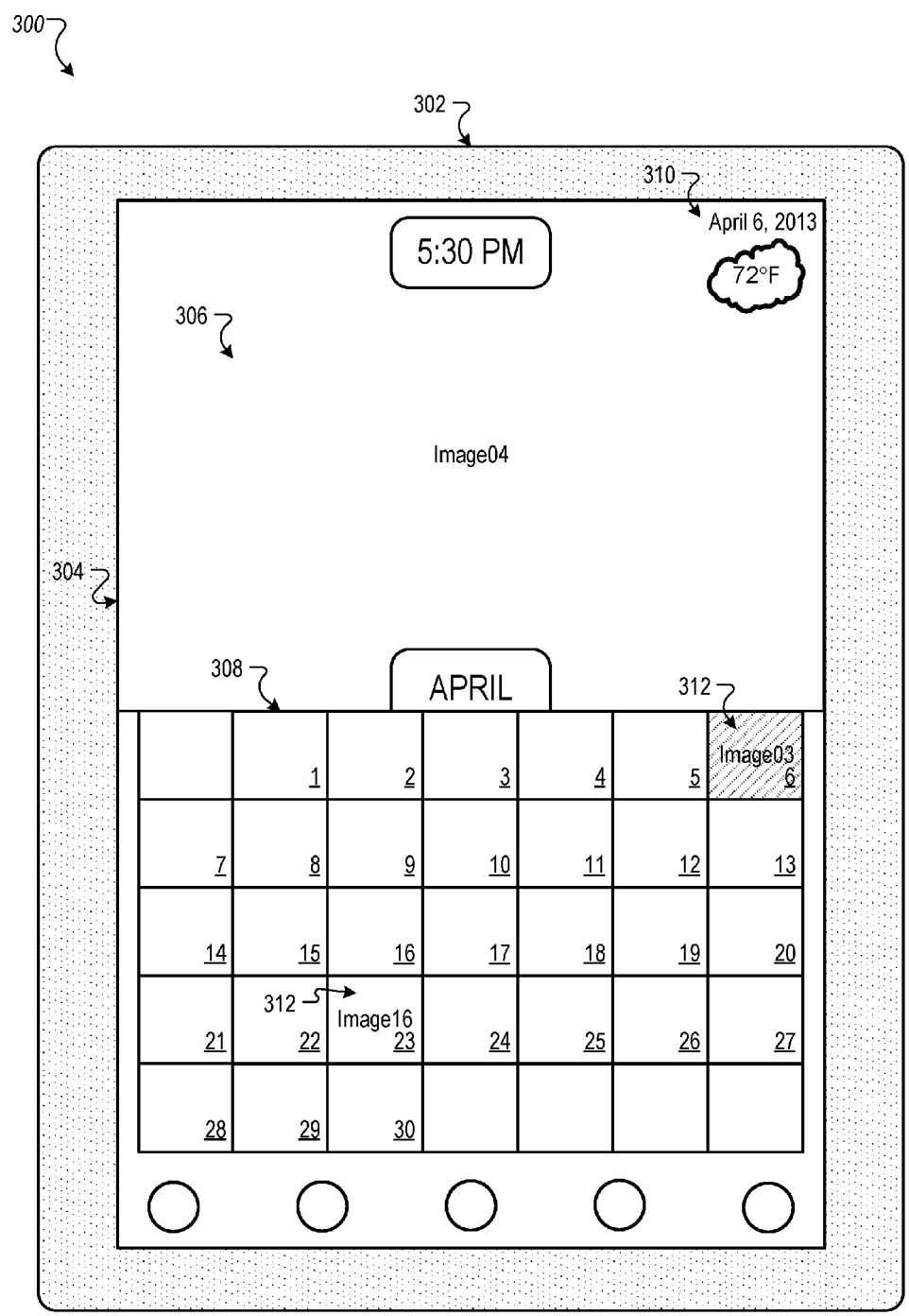
FIG. 3A is an illustration of an example image display device for displaying images based on time.

FIG. 3A is an illustration 300 of an example image display device for displaying images based on time. In this example, the image display device 302 is an electronic wall calendar 302. The wall calendar 302 includes, for example, a data processing apparatus, a display screen for output, and software for causing the display of images and other data, such as calendar information. The electronic wall calendar may also include various other components and features, such as a camera, speaker(s), microphone, remote control, wired and/or wireless network interface controller (e.g., Wi-Fi and/or Bluetooth), communications ports (e.g., USB, IEEE 1394, and/or fiber optic), and solid state and/or magnetic storage device(s), to name a few.

The wall calendar 302 includes a display 304, such as a touch-screen LCD monitor, with an image display area 306 and a calendar display area 308. The display portions are examples, and additional display configurations could be used. For example, the image display area 306 could be larger or smaller, and could occupy the left, right, and/or bottom of the wall calendar's display 304. The calendar display area 308 could also be larger or smaller, could occupy a different area of the display 304, and could display a period of time other than a month, such as a day, week, or year. The wall calendar also shows the current date 310 as Apr. 6, 2013, and the box 312 for the current day is highlighted in the calendar display area 306.

Assuming, by way of example, that the wall calendar 302 is using the slideshow schedule 214 discussed above with reference to FIG. 2, and given a current date/time of Apr. 6, 2013, the images eligible for display are Image03, Image04, Image13, and Image14. In some implementations, the images rotate presentation in the image display area 306. For example, each of the eligible images may be displayed for 1 minute before another image is rotated in. In some implementations, multiple eligible images may be displayed in the image display area, e.g., arranged in a collage. Other methods for displaying images may also be used, such as displaying images as a background for the entire display 304, or displaying an image as a background for the calendar display area 308

In some implementations, a time window has a corresponding area for display of the image(s) associated with the time window. For example, the calendar display area 306 includes a box 312 for Apr. 6, 2013. The image, Image03 that is associated with Apr. 6, 2013 can be displayed in the box 312. As another example, the calendar display area also includes a box 314 for Apr. 23, 2013. A time window for Apr. 23, 2013 includes an image, Image16, that can be displayed in the box 314, even when a current time is not within the April 23 time window.

In some implementations, the particular image or images being displayed can be customized based on user input. For example, on a touch-screen device, the wall calendar 302 may rotate a new image into the image display area 306 in response to receiving a swipe input in the image display area 316. As another example, selection of an image in a display area for a time window, such as box 314, may cause the corresponding image—or any other images eligible for display during the time window—to be displayed in the image display area 306. Further examples for displaying images are discussed with reference to FIG. 3B, below.

Figure 3B:
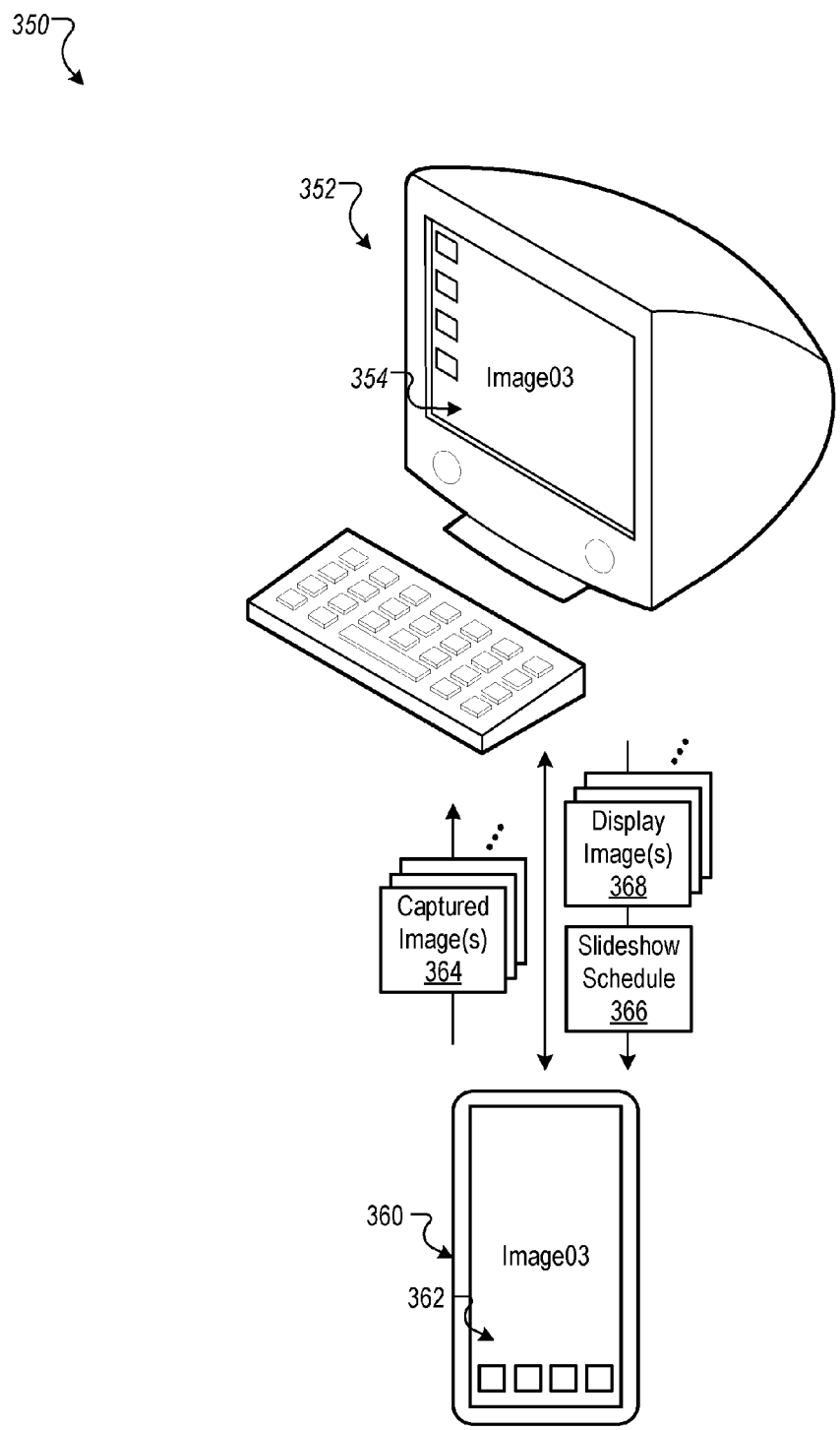
FIG. 3B is an illustration of an example of displaying and providing images based on time.

FIG. 3B is an illustration 350 of an example of displaying and providing images based on time. The example includes an image display device 352 that, in this example, is a personal computer. The image display device 352 can display images in a display area 354, e.g., as one or more rotating background images, or for display during a sleep mode for the personal computer.

The image display device 352 is in communication with a user device 360 that, in this example, is a smart phone having its own image display area 362. Communication between the user device 360 and image display device 352 may be wired or wireless, and data can be transferred one-way or both ways. In some implementations, the user device 360 includes a camera for capturing images. Captured images 364 can be transferred to the image display device 352. For example, a smart phone may include an application for providing images directly to a personal computer using a USB cable or Bluetooth connection, or may transfer images to a network storage device accessible by both the personal computer and the smart phone.

In some implementations, the image display device 352 can use the captured images 364, and associated timestamp information, to create a slideshow schedule 366. The slideshow schedule 366 may also include images other than the captured images 364 provided by the user device 360, such as images obtained from an image server, images provided by other user devices, and/or images captured by the image display device 352. The image display device 352 can display images, including one or more captured images 364, in its display area 354 according to the slideshow schedule 366.

In some implementations, the image display device 352 provides the user device 360 with the slideshow schedule 366. The user device 360 may then display images in its own image display area 362 according to the slideshow schedule 366. In some implementations, the image display device 352 provides display images 368 directly to the user device 360 for display. For example, the personal computer can transmit every image specified by the slideshow schedule 366 to the smart phone, so that the smart phone can retrieve the images from its local storage device for display on demand and/or in accordance with the slideshow schedule 366.

In some implementations, the image display device 352 pushes the display images 368 to the user device 360 on an as-needed basis according to the slideshow schedule 366. For example, the personal computer may wait to transmit images to the user device until the current time is within a time window associated with the images. In some implementations, the slideshow schedule 366 and/or images 368 may be stored on a network device, such as a network hard drive or server computer. In these situations, images may be pushed to, or pulled by, the image display device 352 and/or user device 360. For example, a server computer storing the display images 368 and slideshow schedule can provide images to the image display device 352 and/or user device 360 in accordance with the slideshow schedule 366.

While the foregoing examples depict particular types of electronic devices providing images for display and displaying images, any type or number of devices may share and display images with one another in accordance with a slideshow schedule. For example, devices may be associated with a user account, and a synchronized slideshow schedule can cause display of images on multiple devices at one time. Each image display device may be capable of displaying images in a number of ways, and the manner in which images are displayed may be the same or different for different devices. For example, a virtual wall calendar display may be used on a personal computer, while a collage display may be used on a smart phone.

In some implementations, a user may subscribe to a public slideshow schedule provided by another user, or a third party slideshow schedule provider. For example, a user may customize a slideshow schedule for an electronic wall calendar that depicts a different image each day of the year. The user can make the slideshow schedule and images public, allowing other users to access, use, and/or customize the slideshow schedule on their own devices.

Figure 4:
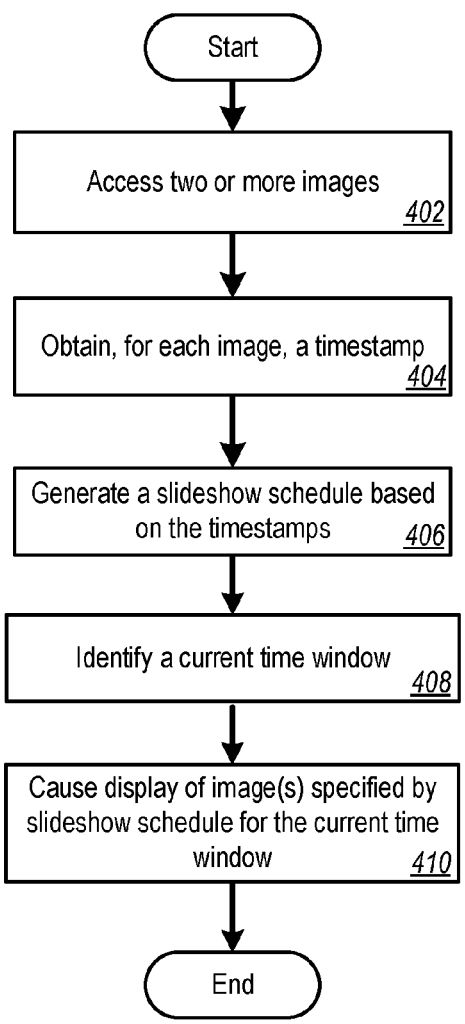
FIG. 4 is a flow chart of an example process for displaying images based on time.

FIG. 4 is a flow chart of an example process for displaying images based on time. The process may be used by a data processing apparatus that is used to realize one or more of the systems described above, such as an image display device. In particular, the process 400 may generate a slideshow schedule for images based on timestamps and cause display of the images according to the slideshow schedule.

Two or more images are accessed (402). In some implementations, the images are accessed on a storage device of an image display system. For example, an image display device that is a server computer may access images stored on one or more storage devices.

For each image, a timestamp is obtained (404). In some implementations, obtaining a timestamp includes obtaining metadata timestamp, such as an Exif timestamp, included in metadata, such as Exif data, for an image. The metadata timestamp may indicate a time that the corresponding image was captured by an image capturing device, such as a digital camera. In some implementations, obtaining a timestamp includes obtaining a user specified timestamp derived from user input. For example, a user of a smart phone may upload an image to the image display device and specify a date for the image. The specified date may be the date the image was captured, or any other date specified by the user.

A slideshow schedule is generated based on the timestamps (406). The slideshow schedule specifies, for each of two or more time windows, one or more of the images for display during the time window. In some implementations, the timestamp of each image specified by the slideshow schedule for display during a time window specifies a time included in a period of time specified by the time window. For example, if a time window specifies the month of November, each image specified by the slideshow schedule for display during that time window has a timestamp in the month of November. As discussed above, time windows can specify any period(s) of time, such as an hour, day, month, year, every other Saturday, etc.

In some implementations, the slideshow schedule specifies two or more images for display during a particular time window. The slideshow schedule may further specify an alternating display for the images during the particular time window. For example, if three images are specified for display for a particular month, they may be periodically rotated, e.g., the image being displayed may change every 30 seconds, every hour, or every day. In some implementations, the slideshow schedule may further specify the display of multiple images during a particular time window. For example, if three images are specified for display for a particular week, they may be displayed together as a three image collage. The collage itself may rotate display of images. For example, if a collage includes one large display area and two small display areas, the images may periodically rotate display in the various display areas.

A current time window is identified (408). The current time window is identified based on a current time. In some implementations, multiple time windows may be identified based on the current time. For example, if a current time is May 15, a time window for the day, May 15, may be identified, as well as a time window for the month of May.

The one or more images specified by the slideshow schedule for the current time window are displayed (410). In some implementations, the data processing apparatus performing the process 400 causes display of the image(s) on its own display. For example, an electronic wall calendar or smart phone used to perform the process 400 may cause the image(s) to be displayed on the screen of the calendar or smart phone. As described in detail above, the manner in which images are displayed may depend on the particular device, e.g., an electronic wall calendar may have a portion of the screen specified for the display of slideshow images.

In some implementations, the slideshow data is provided to a user device, and the slideshow data causes display, on the user device, of at least one of the images specified by the slideshow schedule for the current time window. For example, a server computer used to implement an image display device may provide the slideshow schedule to a user device, such as an electronic wall calendar, using a communications network, such as the Internet. The slideshow schedule may include instructions that, when executed by the user device, cause display of the images on the user device in accordance with the slideshow schedule. As discussed above, other methods for causing display of images on a user device in accordance with the slideshow schedule may be used, such as individually pushing images to a user device for temporary storage and display, or providing instructions to a user device that cause the user device to obtain images for display from a network storage device.

Figure 5:
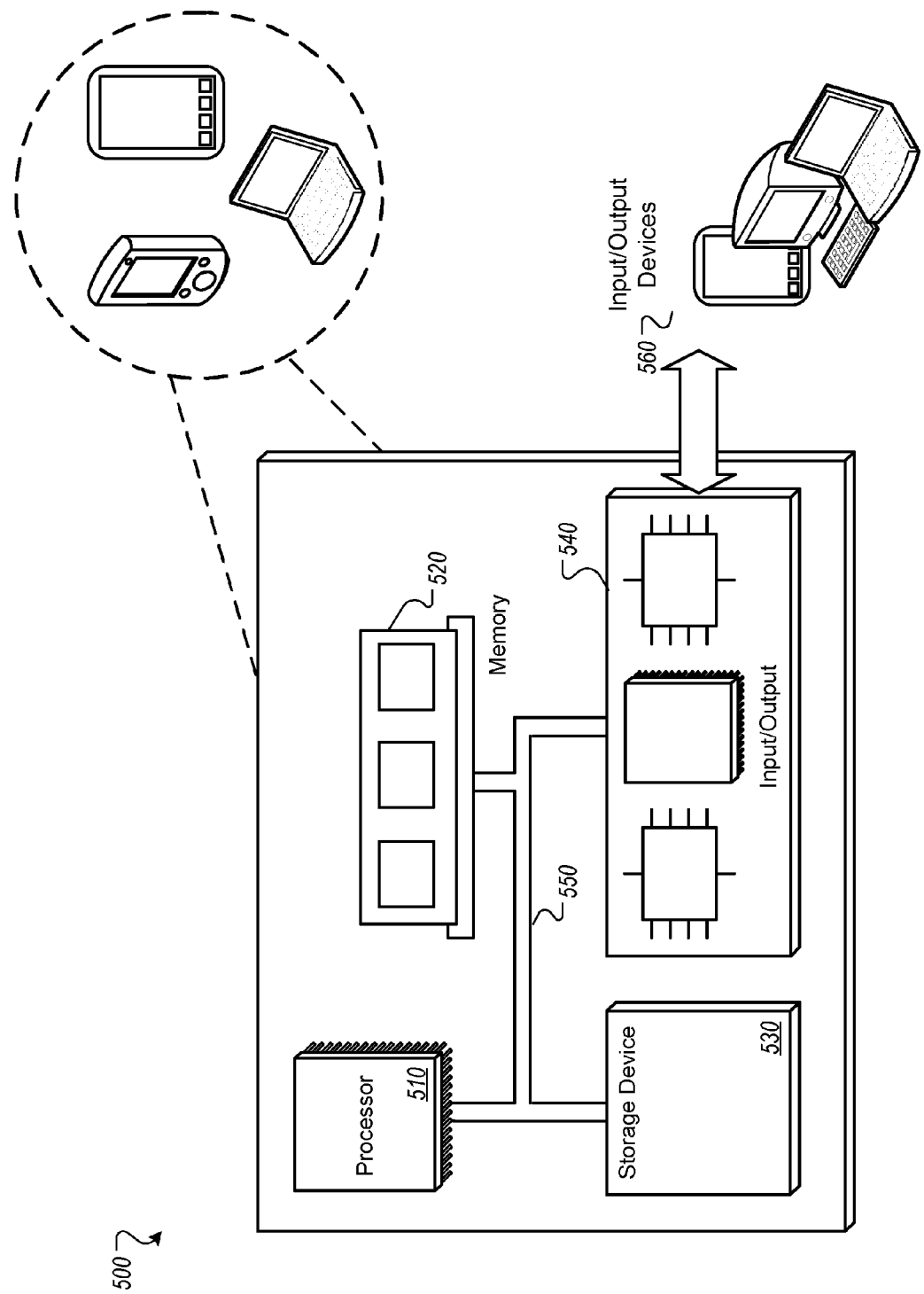
FIG. 5 is a block diagram of an example data processing apparatus.

FIG. 5 is a block diagram of an example data processing apparatus 500 that can be used to perform operations described above. The apparatus 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the apparatus 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the apparatus 500. In one implementation, the storage device 530 is a computer-readable medium. In various different implementations, the storage device 530 can include, for example, a hard disk device, an optical disk device, a storage device that is shared over a network by multiple computing devices, e.g., a cloud storage device, or some other large capacity storage device.

The input/output device 540 provides input/output operations for the apparatus 500. In one implementation, the input/output device 540 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example data processing apparatus has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

What is claimed is:

1. A method comprising:
   displaying, on an electronic display device, an electronic wall calendar comprising an image display area and a calendar display area;
   displaying, within the calendar display area, a plurality of selectable date boxes, each date box corresponding to a particular calendar date of a particular calendar month and a time window that corresponds to that particular calendar date and particular calendar month,
   accessing a plurality of images;
   obtaining, for each of the images of the plurality of images, a timestamp for the image, wherein the timestamp indicates a date and time for which the image was captured by an image capture device;
   generating, based on the timestamps for each of the images, a slideshow schedule, the slideshow schedule specifying, for each time window, one or more of the images for display during the time window, wherein for each time window the images specified by the slideshow schedule have respective timestamps indicating a date and time that occurs within the time window;

identifying, based on a current time, a current time window from the time windows, wherein the current time window matches one of the time windows of one of the displayed date boxes and the current time falls within the current time window;

causing display, in the calendar display area, of the one or more images specified by the slideshow schedule for the time window that matches current time window;

receiving a user selection of one of the date boxes as a selected date box, the selected date box corresponding to a combination of a calendar date and calendar month that is different from the combination of the calendar date and calendar month specified by the current time window;

selecting the time window corresponding to the selected date box; and causing display, in the calendar display area, of the one or more images specified by the slideshow schedule for the time window corresponding to the selected date box.

2. The method of claim 1, wherein obtaining, for each of the images, a timestamp for the image comprises obtaining, for each of the images, an EXIF timestamp included in EXIF data for the image, the EXIF timestamp indicating a time the image was captured by an image capturing device.

3. The method of claim 1, wherein the slideshow schedule specifies two or more images for display during a particular time window, and wherein the slideshow schedule further specifies an alternating display of the two or more images during the particular time window.

4. The method of claim 1, further comprising:
displaying, within each date box, an image of the one or more images specified by the slideshow schedule for the time window corresponding to the date box.

5. The method of claim 4, further comprising highlighting the date corresponding to the current time window.

6. A system comprising: a data processing apparatus; an electronic display device; and a data store storing instructions that, when executed by the data processing apparatus, cause the data processing apparatus to perform operations comprising:
displaying, on the electronic display device, an electronic wall calendar comprising an image display area and a calendar display area;
displaying, within the calendar display area, a plurality of selectable date boxes, each date box corresponding to a particular calendar date of a particular calendar month and a time window that corresponds to that particular calendar date and particular calendar month,
accessing a plurality of images;
obtaining, for each of the images of the plurality of images, a timestamp for the image, wherein the timestamp indicates a date and time for which the image was captured by an image capture device;
generating, based on the timestamps for each of the images, a slideshow schedule, the slideshow schedule specifying, for each time window, one or more of the images for display during the time window, wherein for each time window the images specified by the slideshow schedule have respective timestamps indicating a date and time that occurs within the time window;

identifying, based on a current time, a current time window from the time windows, wherein the current time window matches one of the time windows of one of the displayed date boxes and the current time falls within the current time window;

causing display, in the calendar display area, of the one or more images specified by the slideshow schedule for the time window that matches current time window;

receiving a user selection of one of the date boxes as a selected date box, the selected date box corresponding to a combination of a calendar date and calendar month that is different from the combination of the calendar date and calendar month specified by the current time window;

selecting the time window corresponding to the selected date box; and causing display, in the calendar display area, of the one or more images specified by the slideshow schedule for the time window corresponding to the selected date box.

7. The system of claim 6, wherein obtaining, for each of the images, a timestamp for the image comprises obtaining, for each of the images, an EXIF timestamp included in EXIF data for the image, the EXIF timestamp indicating a time the image was captured by an image capturing device.

8. The system of claim 6, wherein the slideshow schedule specifies two or more images for display during a particular time window, and wherein the slideshow schedule further specifies an alternating display of the two or more images during the particular time window.

9. The system of claim 8, the operations further comprising:
displaying, within each date box, an image of the one or more images specified by the slideshow schedule for the time window corresponding to the date box.

10. The system of claim 9, the operations further comprising highlighting the date corresponding to the current time window.

11. A non-transitory computer readable medium storing instructions that, when executed by a data processing apparatus, cause the data processing apparatus to perform operations comprising:
displaying, on an electronic display device, an electronic wall calendar comprising an image display area and a calendar display area;
displaying, within the calendar display area, a plurality of selectable date boxes, each date box corresponding to a particular calendar date of a particular calendar month and a time window that corresponds to that particular calendar date and particular calendar month,
accessing a plurality of images;
obtaining, for each of the images of the plurality of images, a timestamp for the image, wherein the timestamp indicates a date and time for which the image was captured by an image capture device;
generating, based on the timestamps for each of the images, a slideshow schedule, the slideshow schedule specifying, for each time window, one or more of the images for display during the time window, wherein for each time window the images specified by the slideshow schedule have respective timestamps indicating a date and time that occurs within the time window;

identifying, based on a current time, a current time window from the time windows, wherein the current time window matches one of the time windows of one of the displayed date boxes and the current time falls within the current time window;

causing display, in the calendar display area, of the one or more images specified by the slideshow schedule for the time window that matches current time window;

receiving a user selection of one of the date boxes as a selected date box, the selected date box corresponding to a combination of a calendar date and calendar month that is different from the combination of the calendar date and calendar month specified by the current time window;

selecting the time window corresponding to the selected date box; and causing display, in the calendar display area, of the one or more images specified by the slideshow schedule for the time window corresponding to the selected date box.

12. The computer readable medium of claim 11, wherein obtaining, for each of the images, a timestamp for the image comprises obtaining, for each of the images, an EXIF timestamp included in EXIF data for the image, the EXIF timestamp indicating a time the image was captured by an image capturing device.

13. The computer readable medium of claim 11, wherein the slideshow schedule specifies two or more images for display during a particular time window, and wherein the slideshow schedule further specifies an alternating display of the two or more images during the particular time window.

14. The computer readable medium of claim 11, the operations further comprising:

displaying, within each date box, an image of the one or more images specified by the slideshow schedule for the time window corresponding to the date box.

15. The computer readable medium of claim 14, further comprising highlighting the date corresponding to the current time window.

\* \* \* \* \*